United States Patent [19]

Smeck

[11] 4,077,879

[45] Mar. 7, 1978

[54] TREATMENT OF SULFIDE-BEARING WATERS WITH CHLORINE DIOXIDE

[75] Inventor: Carroll I. Smeck, Huntington Park, Calif.

[73] Assignee: Olin Corporation, New Haven, Conn.

[21] Appl. No.: 693,231

[22] Filed: Jun. 4, 1976

[51] Int. Cl.² ............................................. C02B 1/18
[52] U.S. Cl. .................................. 210/62; 210/63 R; 210/64
[58] Field of Search .................. 210/50, 59, 62, 63 R, 210/64; 424/149; 252/855 R

[56] References Cited

U.S. PATENT DOCUMENTS

| | | | |
|---|---|---|---|
| 2,309,062 | 1/1943 | Graham | 210/62 |
| 2,312,221 | 2/1943 | Sprigman et al. | 210/62 |
| 2,771,416 | 11/1956 | Ryan | 210/62 |
| 2,912,378 | 11/1959 | Bernard | 210/64 |
| 3,082,146 | 3/1963 | Wentworth et al. | 210/62 |
| 3,867,509 | 2/1975 | Geiger et al. | 210/62 |

OTHER PUBLICATIONS

Weber, *Physicochemical Processes for Water Quality Control*, 1972, pp. 397–400 & 442.

*Primary Examiner*—Charles N. Hart
*Assistant Examiner*—Peter A. Hruskoci
*Attorney, Agent, or Firm*—William A. Simons; Thomas P. O'Day

[57] ABSTRACT

The present invention is directed to a process of treating water contaminated with undesirable sulfides by adding chlorine dioxide to water in specified amounts and at specified rates of addition to oxidize the sulfides to sulfates and to simultaneously avoid or substantially retard the information of free colloidal sulfur therein. The invention is particularly useful for treating water which is or will be contaminated with petroleum oil containing undesirable sulfides, e.g., water-petroleum oil mixtures containing sulfate-reducing bacteria.

14 Claims, No Drawings

TREATMENT OF SULFIDE-BEARING WATERS WITH CHLORINE DIOXIDE

The present invention is directed to the treatment of water containing undesirable sulfide compounds. More specifically, the present invention is directed to treating water containing undesirable sulfides to oxidize the sulfides to sulfates and to also prevent or substantially retard formation of free colloidal sulfur therein. The invention is particularly useful in treating water which is or which will be contaminated with petroleum oil, e.g., mixtures of water and petroleum oil having undesirable sulfate-reducing bacteria which have formed undesirable sulfide compounds therein.

Naturally occurring taste, odor and solids problems are often found in water systems and an expanded water treatment industry has evolved in response to these problems. One particularly difficult water system problem involves the removal of various sulfide compounds which are generally undesirable for most water uses. In addition to the putrid odor problems which occur with the presence of sulfides, these sulfides often cause serious disruption to industries using sulfide-containing water systems due to sulfide compound build-up and blockage. The sulfides are particularly problematic in systems containing sulfate-reducing bacteria which feed on sulfate compounds and produce the undesirable sulfides.

These systems have in the past been treated with a variety of different types of chemicals, sometimes used in conjunction with mechanical efforts to overcome the sulfides problem. Among the many suggestions made in the prior art is to treat the sulfide-bearing water with a chlorine atom-containing compound such as molecular chlorine dissolved in water, or chlorine dioxide dissolved in a diluent such as water. While this type of treatment is effective in some systems, it generally fails to totally solve the problem in those instances wherein free colloidal sulfur is formed. For example, throughout the entire petroleum industry, from exploration of oil deposits through crude petroleum oil operations to refinery operations, various undesirable sulfur-containing products are known to build up within equipment and to reduce flow rates, to reduce pressure downstream, to contaminate fluids and even to clog up systems.

Various approaches have been taken to attack this problem, e.g., treatment with chlorine, and yet the treatment methods are not totally effective in that free colloidal sulfur is sometimes formed. For example, in the treatment of a water containing petroleum oil which includes sulfide compound contaminants, the use of molecular chlorine has been suggested. The prior art also suggests, for example, that chlorine in an appropriate diluent may be applied in a ratio of about 10:1 parts chlorine per part sulfide compound to treat water containing petroleum oil with certain sulfate-reducing organisms present therein. Also, it has been suggested that well water contaminated with sulfur-reducing bacteria may effectively be treated with chlorine or chlorine dioxide to prevent formation of sulfides and to avoid undesirable scaling, clogging and the like. However, a reliable method of overcoming the problem of colloidal sulfur formation has not yet been clearly defined. It, therefore, has not been demonstrated, for example in the petroleum industry, that a treatment method may be used whereby the sulfide compounds and the sulfate-reducing bacteria, if present, may be eliminated, and whereby there can be an assurance that formation of substantial or detrimental amounts of free sulfur is also retarded or prevented.

It has now been discovered that these objectives may be achieved by the use of chlorine dioxide added in specified critical amounts and at critical rates of addition. As the examples below will illustrate, free sulfur formation is avoided and sulfide content is reduced (and also a reduction or removal of the problem bacteria, if present) only by using certain critical levels of chlorine dioxide and by adding this chlorine dioxide within very short periods of time, i.e., at critical rates of addition. Moreover, it has been discovered and will be illustrated below that free sulfur formation is not a problem in some systems, and the present invention is, therefore, directed to treatment of waters wherein free sulfur may form upon treatment with chlorine-atom containing compounds as suggested by the prior art.

The present invention is particularly useful in the treatment of any water system which contains undesirable levels of sulfides and which also has a free colloidal sulfur formation problem. Among these may be various types of water systems in the chemical process industries, certain commercial cooling systems, well drilling and pumping of water or water containing fluids, and systems within the petroleum industry.

One process within the petroleum industry for which the present invention is particularly useful is that of petroleum oil production. The operation of wells for removal of petroleum oil includes the cycling and recycling of numerous water streams for flooding operations to increase the oil production. Also, waste water disposal wells are frequently used which involve waste water containing petroleum oil. In each of these two situations, the water contains not only petroleum oil, but also contains detrimental sulfide compounds such as hydrogen sulfide and various metal sulfides, e.g., sodium sulfide, and sulfate-reducing organisms. These sulfate-reducing organisms are not believed to be ordinary sulfur-splitting bacteria but rather are those which feed upon and increase in number by utilization of the sulfate content of the water. A two-fold problem is created in that both the growing bacteria and the sulfide compounds produced by these bacteria during their consumption of sulfate compounds become undesirable. At the same time, the formation of free sulfur may occur upon treatment by prior art methods and this creates another contamination problem. The present invention is directed to solving all of these problems by a single treatment process.

Another process in the petroleum industry which may involve water containing petroleum oil contaminated with various sulfide compounds is the treatment of crude petroleum oil prior to final refinery operations. Sometimes, in these crude petroleum treatment operations, sulfide compound contaminants build up and create clogging and other problems. The formation of free sulfur is usually a related problem in this area. It has now been found that most of these sulfide contaminants may be oxidized back to relatively harmless sulfate compounds and that the formation of free sulfur may substantially be retarded or even prevented by the process of the present invention.

Another process in which the present invention is useful is the refining of crude petroleum, wherein water containing oil utilized in the system often contains sulfur compounds such as hydrogen sulfide, and various metal sulfides, which are particularly objectionable not only from a processing standpoint but also from a final product purity standpoint. The sulfide compounds may or may not be formed at least in part by the above-mentioned sulfate-reducing bacteria, and in some cases the bacteria itself is a serious problem. It has been discovered that the process of the present invention may effectively be used in these operations to successfully enhance the purification of the contaminated waters and the final product.

Many other processes in which the present invention will be particularly useful are well within the purview of the artisan and these processes will become more apparent from the following detailed description of the invention.

As mentioned, the present invention involves the use of chlorine dioxide under specified critical conditions. The chlorine dioxide which is used in the process of the present invention is usually used in combination with an appropriate diluent, e.g., water, and may be produced and metered out by any conventional technique. For example, one commercially available system involves the use of an aqueous sodium chlorite solution source in combination with a water source and a chlorine source in the form of hypochlorous acid (e.g., one of the Diox-olin TM process generator systems for Olin Water Services, Kansas City, Kans.). The hypochlorous acid (generically referred to as active chlorine) and the sodium chlorite aqueous solution reacts upon contact with one another to generate an aqueous solution of chlorine dioxide. In another commercially available chlorine dioxide variation system (e.g., another of the Diox-olin TM process generator systems available from Olin Water Services, Kansas City, Kans.) involves the use of an aqueous sodium chlorite solution in combination with a sodium hypochlorite source and a mineral acid source. These constituents are combined and upon contact produce an aqueous solution of chlorine dioxide. Either of these, or any other chlorine dioxide generation technique which produces ample chlorine dioxide to effectively perform the process of the present invention may be used.

Known analytical techniques may be employed to determine the sulfide contents of any water system to be treated and the formation of free colloidal sulfur either before or upon treatment with, e.g., chlorine, may likewise be determined by known analytical techniques. The sulfide content should be measured as parts sulfides per million parts aqueous solution and will hereinafter be referred to as simply "parts sulfides." Once the sulfides content present in the water system is determined and the amount of chlorine dioxide is calculated, the chlorine dioxide may be added to the water system at any convenient location and by conventional metering means.

In general, at least about 2.7 parts of chlorine dioxide per part sulfides (hereinafter "pcdpps"), measured on an unreacted chlorine dioxide weight basis, may be used. Desirably, at least about 3.0 pcdpps. e.g., at least about 3.25 pcdpps is suggested. Preferably, at least about 4.0 pcdpps may be used. There is no upper limitation to the amount of chlorine dioxide used, although practical economics may dictate that extreme excesses not be used. As the examples below will illustrate, the lower limit of chlorine dioxide amounts is important in order to achieve effective sulfides oxidation to sulfates and to simultaneously substantially retard or even prevent the formation of free colloidal sulfur.

In general the chlorine dioxide should be added to the water to be treated at a rate of about 0.35 pcdpps per second. Desirably, a rate of addition of at least about 0.4 pcdpps per second, and preferably at least about 0.5 pcdpps per second, may be used. As with the amount of chlorine dioxide used, the rate of addition is important to the achievement of both sulfides conversion to sulfates and to the retardation or prevention of free colloidal sulfur formation.

Although the pH of the water to be treated is not critical to the method of the present invention, the examples below illustrate that the pH has some effect on whether or not free colloidal sulfur is formed. Of course, the present invention is directed to the simultaneous removal, i.e., conversion, of sulfides and the retardation or prevention of free colloidal sulfur formation and is, therefore, restricted only to those systems wherein free colloidal sulfur formation may occur.

The following examples are illustrative of various embodiments of the present invention, but the scope of the invention should not be construed to be limited thereto:

Examples 1 to 11 are directed to the establishment of the criticality of the amount of chlorine dioxide needed based on the amount of sulfide compounds present;

Examples 11 to 18 are directed to the criticality of the rate of addition variable;

Subsequent Examples 19 and 20 are directed to the effect of pH level on the formation of colloidal sulfur;

Examples 21 to 67 further illustrate the criticality of the parameters of the present invention;

Examples 68 and 69 illustrate a comparison of the use of the present invention and the use of chlorine to treat sulfide-bearing water and sulfide-bearing water contaminated with petroleum oil;

Example 70 illustrates field testing of the process of the present invention.

EXAMPLE 1

A final volume of 500 ml of test solution, including treatment chemicals, was prepared and tested as follows:

Deionized water was adjusted to a pH of about 7.2 with a solution of $KH_2PO_4$ and NaOH. About 20.3 ml of a standard sulfide solution having 984 ppm of $S^=$ and about 42.6 ml of an aqueous chlorine dioxide solution (940 ppm) were added to 437 ml of the water over a two-second period to achieve a 500 ml solution having 40 ppm sulfides and 80 ppm chlorine dioxide. This corresponded to a 2 to 1 weight ratio of chlorine dioxide to sulfides. The resulting pH was about 5.1. Chlorine dioxide residual was measured in ppm after 20 seconds and sulfide residuals were measured in ppm and/or by strong odor, after 1 minute. Visual examination was made over a period of time to look for signs of formation of free colloidal sulfur, or for the removal of, or for the retardation of avoidance of formation of free colloidal sulfur, e.g., as represented by cloudiness, haziness or clearness. The results of these tests and observations are shown in Table I, below.

EXAMPLES 2-11

Example 1 was repeated, maintaining the same starting pH, 40 ppm sulfide, two-second rate of addition and other test conditions, but varying the ppm of chlorine dioxide to test different ratios of chlorine dioxide to sulfides. These ratios, the other parameters, the resulting pH levels and the test results are shown in Table I, below.

The results shown in Table I suggest that at ratios of 2 and 2.5 pcdpps, free colloidal sulfur formation is very apparent due to the cloudiness of the product. At ratios above about 2.7 or so, an apparent retardation of free colloidal sulfur occurs. Above a ratio of about 3, particularly 3.25, apparent significant retardation or apparent avoidance of free sulfur formation occurs.

colloidal sulfur formation at this ratio occurred at a rate of addition of about 0.38 parts chlorine dioxide per part sulfides per second, and apparent avoidance of free colloidal sulfur formation occurred at a rate of addition of about 0.6 parts chlorine dioxide per part sulfides per second. Thus, it appears that rates of addition above about 0.35 pcdpps per second, and desirably above about 0.4, preferably above about 0.5, pcdpps per second tend to substantially retard or prevent the forma-

TABLE I

| | VARIABLE ClO$_2$ TO S$^=$ RATIOS | | | | | | |
|---|---|---|---|---|---|---|---|
| Example | Ratio of ClO$_2$ to S$^=$ | Resulting pH Level | ClO$_2$ Residual (ppm after 20 sec.) | S$^=$ Residuals (ppm after 1 min.) | Apparent Free Sulfur Retardation | Apparent Free Sulfur Avoidance | Remarks |
| 1 | 2.0 | 5.1 | 0 | 5.5 | No | No | Cloudiness in 2 min. |
| 2 | 2.5 | 3.9 | 0 | 4.3 | No | No | Cloudiness in 2 min. |
| 3 | 3.0 | 3.5 | 0 | 1.3 | Yes | No | Slight haze after 10 min. |
| 4 | 3.5 | 3.5 | Trace | 0 | Yes | Yes | Clear at 1 hr. and at 24 hrs. |
| 5 | 2.7* | 3.5 | Trace | 0 | Yes | No | Very slight haze after 15 min., none after 24 hrs. |
| 6 | 3.0 | 3.5 | Trace | 0 | Yes | Yes | Clear at 1 hr. and at 24 hrs. |
| 7 | 3.25 | 3.5 | 0.9 | 0 | Yes | Yes | Clear at 1 hr. and at 24 hrs. |
| 8 | 3.0 | 3.6 | 0 | 0.43 | Yes | No | Clear after 10 min., perceptable odor, slight haze after 3 hrs. |
| 9 | 3.0 | 3.6 | 0 | 0.43 | Yes | No | Same |
| 10 | 3.0 | 3.6 | 0 | 0.43 | Yes | No | Same |

*Example 4 repeated but ratio recalculated to 2.7 due to loss of strength of stored chlorine dioxide.

tion of free colloidal sulfur.

TABLE II

| | VARIABLE RATES OF ADDITION | | | | | | |
|---|---|---|---|---|---|---|---|
| Example | Ratio of ClO$_2$ to S$^=$ | Period of Addition (seconds) | Rate of Addition (pcd/ps/sec.) | ClO$_2$ Residual (ppm after 20 sec.) | S$^=$ Residuals (ppm after 1 min.) | Apparent Free Sulfur Prevention | Remarks |
| 11 | 3.25 | 2 | 1.63 | 0.85 | 0 | Yes | Clear after 3 hrs., still clear after 24 hrs. |
| 12 | 3.25 | 5 | 0.65 | 0.8 | 0 | Yes | Clear after 3 hrs. |
| 13 | 3.25 | 9 | 0.36 | 0.8 | 0 | Yes | Clear after 3 hrs. |
| 14 | 3.25 | 15 | 0.22 | 0.5 | 0 | No | Clear after 10 min.- very light haze after 20 min. |
| 15 | 3.0 | 14 | 0.21 | 0.55 | 0 | No | Distinct haze after 10 min. |
| 16 | 3.0 | 2 | 1.5 | 0.5 | 0 | Yes | Clear, no. haze after 1, 3 and 24 hrs. |
| 17 | 3.0 | 8 | 0.38 | 0.5 | 0 | No | Clear after 30 min., distinct haze after 1 hr. |
| 18 | 3.0 | 5 | 0.6 | 0.55 | 0 | Yes | After 1 hr. clear, no haze - after 3 hrs. no apparent haze |

EXAMPLES 12-14

Examples 12 to 14 were repeat runs of Example 11 using the same parameters and test conditions but changing the time period for addition of the chlorine dioxide from 2 seconds to 5, 9 and 15 seconds for each of Examples 12 to 14, respectively. Test results are shown in Table II, below.

EXAMPLES 15-18

These examples were performed at a ClO$_2$ to S$^=$ ratio of 3.0 and the chlorine dioxide was added over time periods of 14, 2, 8 and 5 seconds for each of Examples 15 to 18, respectively. Test results are shown in Table II, below.

The results in Table II show that when a ratio of 3.25 parts chlorine dioxide per part sulfides were used, apparent avoidance of free sulfur formation occurred at a period of addition as high as 9 seconds, i.e., at a rate of addition of about 0.36 parts chlorine dioxide per part sulfides per second. At a chlorine dioxide to sulfides ratio of 3 to 1, free colloidal sulfur formation was apparently retarded at a period of addition of 8 seconds and was apparently avoided at a period of addition of 5 seconds at a 3 to 1 ratio. Apparent retardation of free

EXAMPLE 19

This example was performed to merely determine the pH limits, if any, within which the criticality of the amount of chlorine dioxide to sulfides is valid.

Buffered deionized water of specific pH values were prepared in accordance with Lange, N. A., *Handbook of Chemistry*, 10th Edition (McGraw-Hill Co., New York, N.Y. 1961), page 953. Standard aqueous chlorine dioxide solutions were prepared and adjusted to a pH of about 10 with 8N KOH (about 13 drops/liter. The chlorine dioxide was added within about 2 seconds to 40 ppm sulfide content buffered deionized water. Various pH levels were used and various amounts of chlorine dioxide per part sulfides, both within and outside the critical limitations described in conjunction with Examples 1 to 11, above, were used. These tests led to the observations that: (1) at some very high pH levels, there was no apparent criticality to the amount of chlorine dioxide used because no free sulfur formation occurred whether or not the parameters of the present invention were used; (2) this upper pH level did not appear to be a single value but varied, possibly depending upon other parameters; (3) the critical parameters of the present invention would be important only in systems wherein free colloidal sulfur was formed and removed or would have been formed but formation was retarded or prevented; and, (4) at a pH of about 7 or so, higher amounts of chlorine dioxide per part sulfides, e.g. above 3.5 or 4 pcdpps might be required. A level of 4 pcdpps was subsequently found to apparently eliminate the free sulfur at about a pH of about 6.7 to 7.

EXAMPLE 20

A series of tests were performed on aqueous sulfide solutions to determine the affect of pH on free sulfur formation in the sulfide solutions without chlorine dioxide treatment.

A solution of 1,110 ppm sulfides in water at a pH of 10.3 was treated with 5N $H_2SO_4$ dropwise to lower the pH in a stepwise manner from 10.3 down to about 7 at which level no free sulfur was formed. However, upon lowering the pH to 6.8 from 7 large amounts of free sulfur formed immediately. Further, testing at lower levels of sulfide content, e.g. 40 ppm, 15 ppm, 10 ppm and 6.6 ppm, revealed that free sulfur is formed at lower pH levels but is probably not detectable by visual examination below sulfide concentrations of about 10 ppm.

From these tests as well as those of Example 19 and others where some free colloidal sulfur apparently formed upon treatment of the water with chlorine or low levels or slowly added chlorine dioxide, it was concluded that a pH limitation was not definable but that the present invention should be limited to those systems in which free colloidal sulfur is formed or otherwise would be formed upon treatment, if not for the present invention.

EXAMPLES 21-67

These examples in part illustrate further the above-mentioned observations with respect to the present invention and in part show that a definable pH limitation would be inappropriate. The pH levels, parts sulfide, $ClO_2$ to $S^=$ ratio, periods of addition and test results are shown in Table III, as follows:

TABLE III

MULTIPLE VARIABLE TESTS

| Example | pH Start | pH Final | ppm Sulfide | Ratio of $ClO_2$ to $S^=$ | Period of Addition (sec.) | $ClO_2$ Residuals (ppm after 20 sec.) | $S^=$ Residuals (ppm after 1 min.) | Remarks |
|---|---|---|---|---|---|---|---|---|
| 21 | 7.3 | 7.1 | 6.6 | 3 | 2 | 0 | 0.14 - Slight odor | No haze after 2 hrs. After 2 hrs. - 0.02 sulfide, no odor - No change after 6 hrs. |
| 22 | 7.3 | 7.1 | 6.6 | 3.25 | 2 | 0 | 0.22 - Slight odor | No haze in 1 hr. After 2 hrs., no haze, no odor, sulfide - o.02 - After 6 hrs., no change. |
| 23 | 7.3 | 7.1 | 6.6 | 3.5 | 2 | 0 | 0.45 - Moderate odor | No haze in 1 hr. After 2 hrs., no haze, no odor, sulfide - 0.02 - After 6 hrs., no change. |
| 24 | 7.3 | 7.1 | 6.6 | 3.75 | 2 | 0 | 0.08 - Barely perceptible odor | After 1 hr., no haze, no odor, sulfide - 0.02 - After 6 hrs., no change. |
| 25 | 7.3 | 7.0 | 6.6 | 4 | 2 | 0 | 0.08 - Barely perceptible odor | After 1 hr., no haze, no odor, sulfide- 0.02 - After 3 hrs., no change. |
| 26 | 7.3 | 7.2 | 6.6 | 2 | 2 | 0 | 0.6 - Pronounced odor | No haze after 1 hr. but pronounced odor. Part of water placed in capped bottle - No haze or odor after 72 hrs. |
| 27 | | | Part of $H_2O$ from Example 26 acidified to pH 6.8 | | | | | Placed in capped bottle for 72 hrs. at end of 72 hrs., pH still 6.8, no haze, no odor, sulfide - 0.02. |
| 28 | 7.3 | 7.3 | 10 | 4 | 2 | 0.08 | 0.04 - No odor | Doubtful haze after 3 hrs. - Clear, no haze on stirring after 18 hrs. |
| 29 | 7.3 | 7.3 | 10 | 4 | 6 | 0.02 | 0.02 - No odor | Doubtful or no haze. No haze after 18 hrs. |
| 30 | 7.7 | 6.8 | 15 | 4 | 2 | 0.08 | 0 - No odor | Haze in 2 min., cloudy in 5-10 min., slight cloudiness after 24 hrs. |
| 31 | 8.4 | 6.9 | 15 | 4 | 2 | 0.08 | 0 - No odor | Boiled and cooled tap $H_2O$, no dissolved gases, was used. Barely detectable haze after 20 min., none after 24 hrs. |
| 32 | 7.3 | 5.1 | 40 | 2 | 2 | 0 | Strong odor | Cloudiness in 5 min. |
| 33 | 7.7 | 6.5 | 40 | 3 | 2 | 0 | 0 - No odor | Haze in 2 min. - Cloudiness in 5 min. Cloudy after 24 hrs. and 72 hrs. |
| 34 | 7.7 | 6.5 | 40 | 3 | 8 | No test | No test | Haze in 2 min. - Still cloudy after 24 hrs. |
| 35 | 7.7 | 6.4 | 40 | 3.25 | 2 | Trace | 0 | Barely detectable haze in 4 min. - Light cloudiness after 1 hr. - No change after 24 hrs. or 72 hrs. |
| 36 | 7.7 | 6.3 | 40 | 3.5 | 2 | 0.95 | 0 | Barely detectable haze in 5 min. - Definite haze after 1 hr. - No change after 24 hrs. and 72 hrs. |
| 37 | 7.7 | 6.2 | 40 | 4.0 | 2 | 10.0 | 0 | Barely detectable haze in 5 min. - Definite haze in 1 hr. - No change after 24 or 72 hrs. |
| 38 | 7.7 | 6.3 | 40 | 3.75 | 2 | 3.0 | 0 | Barely detectable haze in 5 min. - Definite haze in 1 hr. - No change after 24 or 72 hrs. |

| Example | Buffered pH | ppm Sulfide | Ratio of $ClO_2$ to $S^=$ | Period of Addition (sec.) | $ClO_2$ Residuals (ppm after 20 sec.) | $S^=$ Residuals (ppm after 1 min.) | Remarks |
|---|---|---|---|---|---|---|---|
| 39 | 5.1 | 15 | 4 | 2 | 0.1 | 0 | No initial haze - None in 30 min., none 2 hrs., none 24 hrs. |
| 40 | 5.1 | 15 | 2 | 2 | 0 | Strong $H_2S$ odor | Haze in 2 min. - Cloudiness in 10 min. |
| 41 | 5.2 | 15 | 3 | 2 | 0 | Perceptible sulfide odor | Barely perceptible haze in 4 min. - Same after 30 min. Distinct haze after 24 hrs. No odor after 30 min. |

TABLE III-continued
MULTIPLE VARIABLE TESTS

| | | | | | | | |
|---|---|---|---|---|---|---|---|
| 42 | 6.2 | 15 | 4 | 10 | 1.0 | 0 | Water had straw color. Very slight haze after 15 min. - Same after 1 hr. and 24 hrs. |
| 43 | 6.3 | 15 | 4 | 2 | 0.1 | 0 | Barely detectable haze in 20 min. - Same in 1 hr. No haze detected upon stirring after 24 hrs. |
| 44 | 6.8 | 15 | 4 | 2 | 0.08 | 0 | No immediate haze - Barely detectable haze when viewed in sunlight after 1 hr. - Same 24 hrs. |
| 45 | 6.8 | 40 | 4 | 2 | 1.7 | 0 | Clear - No haze after 1, 2 and 24 hrs. - $ClO_2$ residual after 24 hrs. - 0.35 ppm |
| 46 | 6.8 | 40 | 2 | 2 | 0 | 2.3 - Strong odor | Immediate cloudiness |
| 47 | 6.8 | 40 | 3 | 2 | 0 | 0.2 - Slight odor | Immediate haze - Cloudiness in 2 min. |
| 48 | 6.8 | 40 | 3.5 | 2 | 0 | 0.5 - No odor | Haziness in 1 min. but barely perceptible in direct sunlight. |
| 49 | 7.3 | 40 | 2 | 2 | 0 | Strong odor | Cloudiness in 1 min. |
| 50 | 7.3 | 40 | 3 | 2 | 0 | No odor | Haziness in 1 min. - Cloudiness in 5 min. No sulfide test but no detectable odor. |
| 51 | 7.3 | 40 | 3.25 | 2 | 0 | No odor | Haziness in 1 min. - Cloudiness in 2 min. No odor detected. |
| 52 | 7.3 | 40 | 3.5 | 2 | Not run | No odor | Slight haziness in 2 min. - Very slight cloudiness in 30 min. |
| 53 | 7.5 | 15 | 4 | 2 | 0.08 | 0 | Clear - No haziness after 1 hr. - 24 hrs. |
| 54 | 7.5 | 15 | 4 | 12 | 0.08 | 0 | Barely detectable haze in sunlight after 20 min. - Same after 24 hrs. |
| 55 | 7.6 | 20 | 2.5 | 2 | 0 | 0.7 - Moderate odor | Very slight haze after 10 min. - Perceptible odor - Clear, no haze after 24 hrs. - No odor. |
| 56 | 8.0 | 40 | 2.5 | 2 | 0 | Strong odor | Haziness in 2 min. - Cloudiness in 5 min. |
| 57 | 8.3 | 40 | 2 | 2 | 0 | Strong odor | Clear - No haze after 1 hr. - Same after 2 hrs. |
| 58 | 8.3 | 40 | 2 | 2 | 0 | 8.5 - Strong odor | Haze in 5 min. - Cloudy in 10 min. after standing overnight in open beaker and in a capped bottle, haziness and cloudiness disappeared - No sulfide odor, 0.0 ppm. |
| 59 | 8.4 | 40 | 3 | 8 | 0 | 1.9 - Strong odor | Haziness developed in 5 min. - Haze vanished in 1 hr. - Water clear, no sulfide odor. |
| 60 | 8.8 | 40 | 2 | 2 | 0 | 12.0 | Clear, no haze after 1 hr. - Placed in capped bottle overnight - Still clear, sulfide - 0.12, slight odor. |
| 61 | 8.9 | 15 | 4.5 | 2 | No test | 0.1 - No odor | Clear, no haze after 3 hrs. |
| 62 | 9.0 | 15 | 2 | 2 | 0 | 5.5 - Strong odor | Clear, no haze after 40 min. - Addition 19 ppm $ClO_2$ added, slight sulfide odor, then another 19 ppm $ClO_2$, light straw. |
| 63 | 9.0 | 15 | 4 | 2 | 0 | 0.9 - Distinct odor | Clear, no haze. |
| 64 | 9.3 | 40 | 3 | 5 | 0 | 5.5 | Clear, no haze after 2 hrs. |
| 65 | 9.3 | 40 | 2 | 2 | 0 | 14.5 | No haze after 2 hrs., strong sulfide odor. |
| 66 | 11.1 | 40 | 3 | 2 | 0 | Perceptible odor | Clear, no haze after 2 hrs. |
| 67 | 11.1 | 40 | 3 | 5 | 0 | 0.2 Perceptible odor | Clear, no haze after 2 hrs. |

EXAMPLE 68

Standard sulfide solution was added to each of two beakers containing tap water to give about 10 ppm of sulfide. Chlorine, equivalent to 100 ppm (10:1 ratio), was added to one beaker and chlorine dioxide, equivalent to only 40 ppm (4:1 ratio), was added to the second beaker. After one minute, the water in both of the beakers was quite clear and free of turbidity. However, within three minutes the chlorine treated water developed a cloudiness believed to be due to free colloidal sulfur. On the other hand, the water treated with chlorine dioxide remained perfectly clear and still possessed this state of clarity at the conclusion of the demonstration, some 45 minutes later.

EXAMPLE 69

Equal volumes of unfiltered oil-contaminated water were placed in each of two beakers and standard sulfide solution to effect a 10 ppm solution was added to each beaker. High turbidity of the water indicated it would be difficult to observe any increase in turbidity that could be attributed to free sulfur. Nonetheless, 100 ppm of chlorine and only 40 ppm of chlorine dioxide, respectively, were added as in the test with the tap water. After allowing a 10 minute period for the water to assume a more quiescent state, it was apparent that the chlorine treated water possessed considerably more turbidity than the one treated with chlorine dioxide. These tests were repeated using filtered oil-contaminated water with 40 ppm of sulfide instead of 10 ppm. This represented the maximum sulfide content that had been found in sample refinery water, and the filtering eliminated much of the turbidity. Equal volumes of the filtered water were inoculated with 40 ppm of sulfide. Chlorine dioxide, equivalent to 160 ppm (4:1 ratio), was added to one beaker and chlorine, equivalent to 400 ppm (10:1 ratio), was added to the second beaker. Almost instantaneously, the chlorine treated water developed an intense cloudiness while the chlorine dioxide treated water remained perfectly clear. A sulfide test performed some 10 minutes later on the clear water showed no residual sulfides.

EXAMPLE 70

A waste water disposal system at an oil well site containing about 15 parts sulfides and contaminated with oil was treated with in excess of 60 ppm chlorine dioxide (i.e., at 4 pcdpps) in a period of addition of about one second by slug feeding. Observations indicated that no free colloidal sulfur had formed whereas previous treatment with chlorine had resulted in apparent free colloidal sulfur formation. Also, analysis of the treated water showed that substantially all sulfide components had been converted.

What is claimed is:

1. In a process for purifying an aqueous solution containing sulfide compound contaminants wherein said aqueous solution is one in which free colloidal sulfur is formed upon treatment with a chlorine atom-containing compound, the improvement which comprises:

treating said aqueous solution with chlorine dioxide by adding the chlorine dioxide:
(i) in an amount of at least about 2.7 parts chlorine dioxide per part sulfides, measured on an unreacted chlorine dioxide weight basis; and
(ii) at a rate of at least about 0.35 parts chlorine dioxide per part sulfides per second, so as to remove the sulfides by oxidation thereof, and so as to simultaneously substantially retard the formation of free colloidal sulfur in said aqueous solution.

2. The process of claim 1 wherein said chlorine dioxide is added in an amount of at least about 3.0 parts chlorine dioxide per part sulfides.

3. The process of claim 1 wherein said chlorine dioxide is added at a rate of at least about 0.4 parts chlorine dioxide per part sulfides per second.

4. The process of claim 1 wherein said chlorine dioxide is added in an amount of at least about 3.25 parts chlorine dioxide per part sulfides.

5. The process of claim 1 wherein said chlorine dioxide is added in an amount of at least about 4.0 parts chlorine dioxide per part sulfides.

6. The process of claim 1 wherein said chlorine dioxide is added at a rate of at least about 0.5 parts chlorine dioxide per part sulfides per second.

7. The process of claim 1 wherein said aqueous solution contains sulfate-reducing bacteria and wherein said treating results in substantial elimination of said bacteria.

8. The process of claim 7 wherein said chlorine dioxide is added:
(i) in an amount of at least about 3.0 parts chlorine dioxide per part sulfides; and
(ii) at a rate of at least about 0.4 parts chlorine dioxide per part sulfides per second.

9. The process of claim 8 wherein said chlorine dioxide is added:
(i) in an amount of at least about 3.25 parts chlorine dioxide per part sulfides; and
(ii) at a rate of at least about 0.5 parts chlorine dioxide per part sulfides per second.

10. The process of claim 9 wherein said chlorine dioxide is added in an amount of at least about 4 parts chlorine dioxide per part sulfides.

11. The process of claim 1 wherein said aqueous solution is contaminated with petroleum oil and contains at least about 10 parts per million sulfide compounds.

12. The process of claim 11 wherein said chlorine dioxide is added:
(i) in an amount of at least about 3.0 parts chlorine dioxide per part sulfides; and
(ii) at a rate of at least about 0.4 parts chlorine dioxide per part sulfides per second.

13. The process of claim 12 wherein said chlorine dioxide is added:
(i) in an amount of at least about 3.25 parts chlorine dioxide per part sulfides; and
(ii) at a rate of at least about 0.5 parts chlorine dioxide per part sulfides per second.

14. The process of claim 13 wherein said chlorine dioxide is added in an amount of at least about 4 parts chlorine dioxide per part sulfides.

* * * * *